United States Patent
Hegar et al.

(10) Patent No.: US 9,970,696 B2
(45) Date of Patent: May 15, 2018

(54) DEFROST FOR TRANSCRITICAL VAPOR COMPRESSION SYSTEM

(75) Inventors: Michal Hegar, Prague (CZ); Marketa Kopecka, Vsetin (CZ); Michal Kolda, Prague (CZ); Vaclav Rajtmajer, Beroun (CZ)

(73) Assignee: THERMO KING CORPORATION, Minneapolis, MN (US)

(*) Notice: Subject to any disclaimer, the term of this patent is extended or adjusted under 35 U.S.C. 154(b) by 1781 days.

(21) Appl. No.: 13/187,077

(22) Filed: Jul. 20, 2011

(65) Prior Publication Data

US 2013/0019617 A1 Jan. 24, 2013

(51) Int. Cl.
F25B 47/02 (2006.01)
F25B 9/00 (2006.01)

(52) U.S. Cl.
CPC .......... *F25B 47/022* (2013.01); *F25B 9/008* (2013.01); *F25B 2309/061* (2013.01); *F25B 2600/112* (2013.01); *Y02B 30/743* (2013.01)

(58) Field of Classification Search
CPC .... F25B 47/02; F25B 9/008; F25B 2600/112; F25B 2309/061; F25B 2341/064; F25B 2341/063; F25B 2700/171; F25B 2600/025; F25B 49/025; F25B 2600/11; F25B 2600/13; F25B 2600/02
USPC .......... 62/81, 156, 225, 151, 80, 155, 228.1, 62/178–179
See application file for complete search history.

(56) References Cited

U.S. PATENT DOCUMENTS

| | | | |
|---|---|---|---|
| 4,215,555 A * | 8/1980 | Cann | F25B 13/00 62/324.2 |
| 4,565,070 A | 1/1986 | Raymond | |
| 5,669,222 A | 9/1997 | Jaster et al. | |
| 6,418,737 B1 * | 7/2002 | Kuroki | F24H 4/04 62/156 |
| 6,560,980 B2 | 5/2003 | Gustafson et al. | |
| 6,691,524 B2 | 2/2004 | Brooke | |

(Continued)

FOREIGN PATENT DOCUMENTS

DE  10043169  4/2001
EP  1344938  9/2003
(Continued)

OTHER PUBLICATIONS

PCT/US2012/044002 International Search Report and Written Opinion dated Dec. 20, 2012 (7 pages).
(Continued)

*Primary Examiner* — David Teitelbaum
*Assistant Examiner* — Martha Tadesse
(74) *Attorney, Agent, or Firm* — Hamre, Schumann, Mueller & Larson, P.C.

(57) ABSTRACT

A method of defrosting a transcritical vapor compression system having a compressor for compressing a refrigerant, a first heat exchanger for cooling the refrigerant during a cooling mode, an expansion valve for decreasing the pressure of the refrigerant, and a second heat exchanger for cooling a space during the cooling mode. The method includes attaining a superheated refrigerant condition in a defrost mode of the transcritical vapor compression system and defrosting the second heat exchanger in the defrost mode by directing the superheated refrigerant to the second heat exchanger without bypassing the first heat exchanger.

19 Claims, 2 Drawing Sheets

(56) References Cited

U.S. PATENT DOCUMENTS

| | | | |
|---|---|---|---|
| 6,694,763 B2 | 2/2004 | Howard | |
| 6,729,152 B2 | 5/2004 | Gully et al. | |
| 6,968,708 B2 | 11/2005 | Gopalnarayanan et al. | |
| 7,191,609 B2 | 3/2007 | Yamasaki et al. | |
| 7,275,376 B2 * | 10/2007 | Swofford | F25B 47/02 |
| | | | 62/155 |
| 7,647,790 B2 | 1/2010 | Ignatiev et al. | |
| 2005/0044885 A1 | 3/2005 | Pearson | |
| 2005/0210891 A1 | 9/2005 | Matsumoto et al. | |
| 2008/0127672 A1 | 6/2008 | Ducoulombier et al. | |
| 2008/0148751 A1 * | 6/2008 | Swofford | F25B 41/062 |
| | | | 62/210 |
| 2008/0168781 A1 | 7/2008 | Yakumaru et al. | |
| 2008/0184715 A1 * | 8/2008 | Chen | F25B 47/022 |
| | | | 62/81 |
| 2008/0256974 A1 | 10/2008 | Verma et al. | |
| 2008/0302118 A1 | 12/2008 | Chen et al. | |
| 2009/0044557 A1 | 2/2009 | Weber et al. | |
| 2009/0077983 A1 * | 3/2009 | Singh | F25B 49/005 |
| | | | 62/126 |
| 2009/0241566 A1 | 10/2009 | Bush et al. | |
| 2010/0024452 A1 | 2/2010 | Lifson et al. | |
| 2010/0071391 A1 | 3/2010 | Lifson et al. | |
| 2010/0083679 A1 | 4/2010 | Kolstad et al. | |
| 2011/0041526 A1 * | 2/2011 | Okuda | F25B 9/004 |
| | | | 62/93 |

FOREIGN PATENT DOCUMENTS

| | | |
|---|---|---|
| JP | 2001082802 | 3/2001 |
| WO | 2006101567 | 9/2006 |

OTHER PUBLICATIONS

European Search Report issued in corresponding European Application No. 12815188.3 dated Mar. 27, 2015 (6 pages).

* cited by examiner

US 9,970,696 B2

DEFROST FOR TRANSCRITICAL VAPOR COMPRESSION SYSTEM

BACKGROUND

The present invention relates to a method and apparatus for defrosting a heat exchanger coil of a transcritical vapor compression system.

Transcritical vapor compression systems typically include a compressor, a gas cooler, an expansion valve and an evaporator. Typically, electric heaters are installed in front of a heat transfer surface of the evaporator for defrosting the evaporator heat transfer surface. When a defrost mode is initiated, a controller stops the compressor and energizes the electric heaters. The heaters are turned off, and cooling mode resumes, when the evaporator coil temperature increases.

SUMMARY

In one aspect, the invention provides a method of defrosting a transcritical vapor compression system operable in a cooling mode and a defrost mode, the transcritical vapor compression system having a compressor for compressing a refrigerant, the compressor having a compressor inlet and a compressor outlet and operating at a first speed/frequency during the cooling mode, a first heat exchanger for cooling the refrigerant during the cooling mode, an expansion valve for decreasing the pressure of the refrigerant, the expansion valve having a variable opening, and a second heat exchanger for cooling a space during the cooling mode. The method includes directing a superheated refrigerant gas from the compressor to the first heat exchanger during the defrost mode, then directing the superheated refrigerant gas from the first heat exchanger to the expansion valve during the defrost mode, then directing the superheated refrigerant gas from the expansion valve to the second heat exchanger during the defrost mode, and defrosting the second heat exchanger with the superheated refrigerant gas.

In another aspect, the invention provides a transcritical vapor compression system. The transcritical vapor compression system includes a compressor for compressing a refrigerant, the compressor having a compressor inlet and a compressor outlet. The system also includes a first heat exchanger for cooling the refrigerant, an expansion valve for decreasing the pressure of the refrigerant, the expansion valve having a variable opening, and a second heat exchanger for heating the refrigerant. The system also includes a controller programmed to decrease the speed/frequency of the compressor during a defrost mode, programmed to determine a desired superheat temperature, programmed to compare the desired superheat temperature with a measured temperature proximate the compressor inlet, and programmed to adjust the expansion valve based on the comparison between the desired superheat temperature and the measured temperature during the defrost mode.

In another aspect, the invention provides a method of defrosting a transcritical vapor compression system having a compressor for compressing a refrigerant, a first heat exchanger for cooling the refrigerant during a cooling mode, an expansion valve for decreasing the pressure of the refrigerant, and a second heat exchanger for cooling a space during the cooling mode. The method includes attaining a superheated refrigerant condition in a defrost mode of the transcritical vapor compression system and defrosting the second heat exchanger in the defrost mode by directing the superheated refrigerant to the second heat exchanger without bypassing the first heat exchanger.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
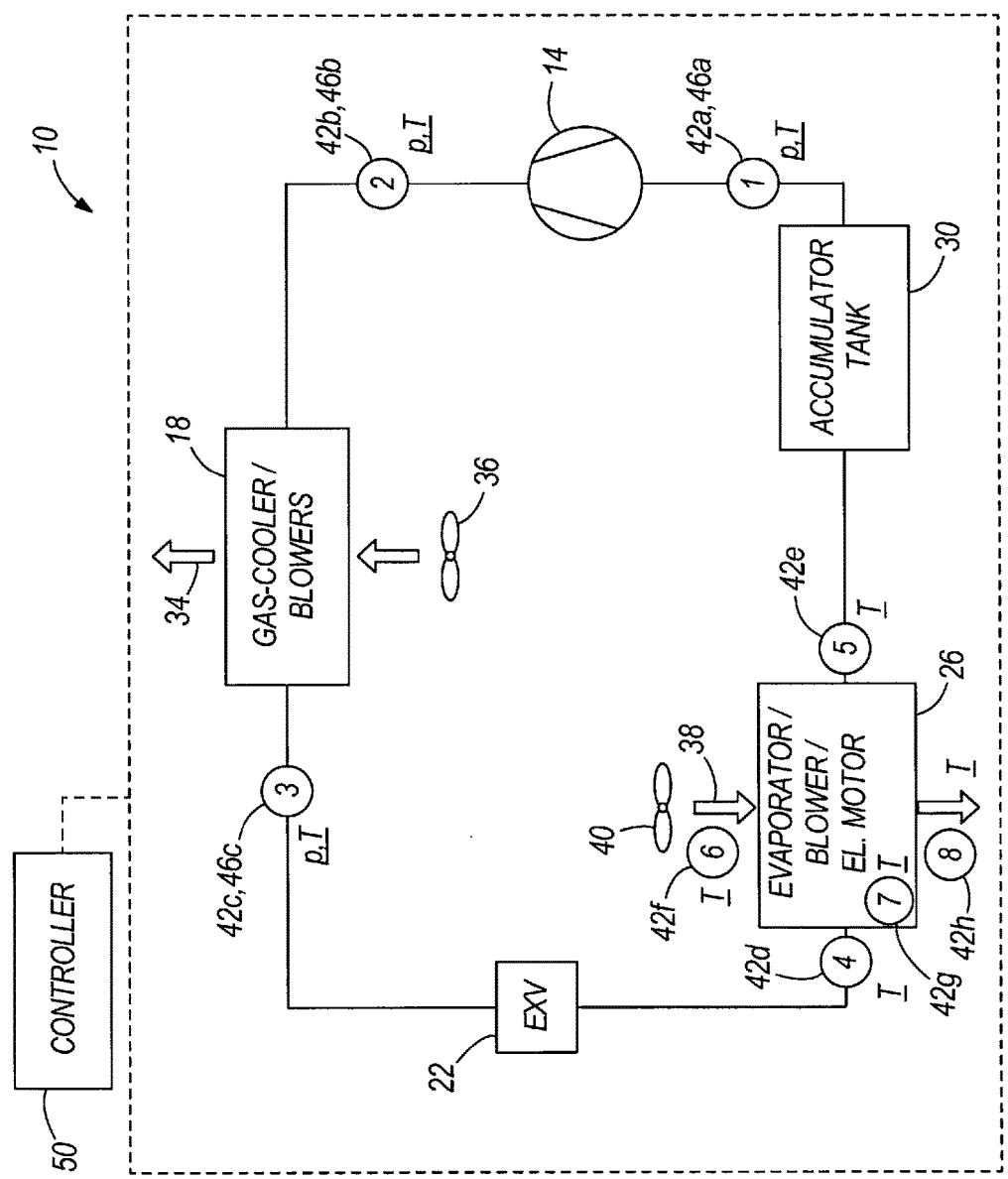
FIG. 1 is a schematic diagram of a transcritical vapor compression system in accordance with the invention.

FIG. 1 illustrates a transcritical vapor compression system 10. The transcritical vapor compression system 10 is a closed circuit single stage vapor compression cycle preferably utilizing carbon dioxide ($CO_2$) as a refrigerant, although other refrigerants suitable for a transcritical vapor compressor system may be employed. The system 10 includes a variable speed/frequency compressor 14, a gas cooler 18, an expansion valve 22, an evaporator 26 and an accumulator tank 30 connected in series. A blower 36, or blowers, move air over the gas cooler 18 for heat exchange therewith, and a blower 40, or blowers, move air over the evaporator 26 for heat exchange therewith. Temperature sensors 42a-42h are located at the compressor inlet 1 (refrigerant temperature), the compressor outlet 2 (refrigerant temperature), the gas cooler outlet 3 (refrigerant temperature), the evaporator refrigerant inlet 4 (refrigerant temperature), the evaporator refrigerant outlet 5 (refrigerant temperature), the evaporator air inlet 6 (air temperature), the evaporator coil 7 (coil temperature), and the evaporator air outlet 8 (air temperature), respectively. Pressure sensors 46a-46c are located at the compressor inlet 1, the compressor outlet 2, and the gas cooler outlet 3, respectively, for measuring refrigerant pressure.

As shown schematically in FIG. 1, the transcritical vapor compression system 10 is controlled by a controller 50. The controller 50 also controls the opening of the expansion valve 22, the speed/frequency (speed or frequency) of the blowers 36, 40 and the speed/frequency of the compressor 14, and receives input signals from the temperature sensors 42a-42h and the pressure sensors 46a-46c, as will be described in greater detail below.

In a cooling mode, refrigerant exits the evaporator coil 26 as a heated gas and is drawn into a suction port of the compressor 14, which is preferably a variable speed/frequency compressor. The compressor 14 pressurizes and discharges heated refrigerant gas into the gas cooler 18. In the gas cooler 18, or heat exchanger, the heated refrigerant is cooled to a lower temperature gas as a result of a forced flow of air 34 flowing over the gas cooler 18 and generated by the blowers 36, which are preferably variable speed blowers. The gas cooler 18 can include one or more heat exchanger coils having any suitable construction, as is known in the art. Then, the cooled refrigerant is throttled through the expansion valve 22, such as an electronic expansion valve, and directed toward the evaporator coil 26 at a decreased pressure as a liquid-vapor mixture, or wet vapor. In the evaporator coil 26, or heat exchanger, the cooled refrigerant is heated to a higher temperature gas as a result of a forced flow of air 38 generated by blowers 40, such as variable speed blowers. In other words, the refrigerant passing through the evaporator coil 26 absorbs the heat from the flow of air 38 such that the flow of air 38 is cooled. The evaporator coil 26 can include one or more heat exchanger coils having any suitable construction, as is known in the art. Then, the refrigerant passes through the accumulator tank 30, and only vapor refrigerant exits the accumulator tank 30 to the inlet of the compressor 14.

Figure 2:
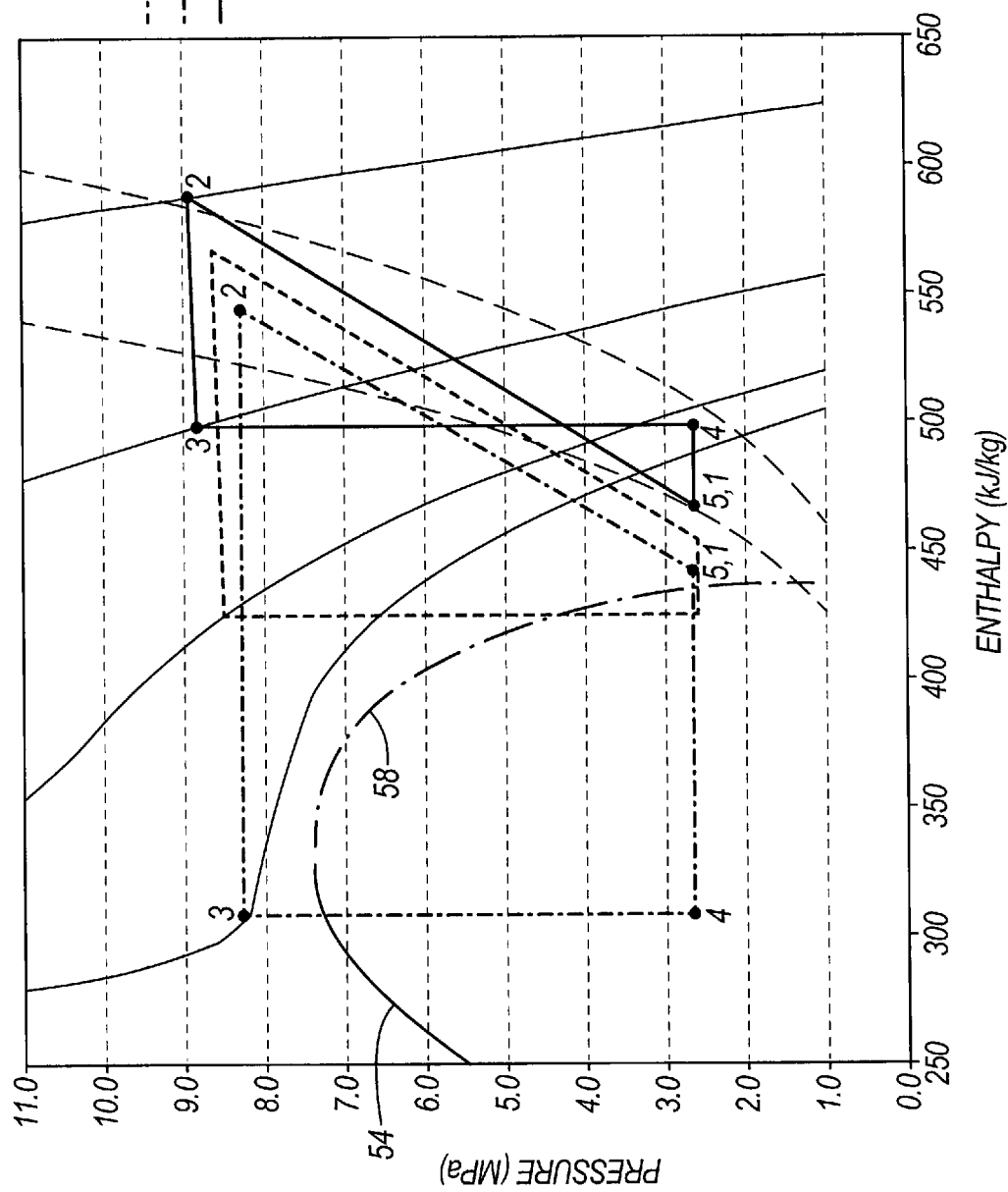
FIG. 2 is a diagram of internal energy and pressure of the transcritical vapor compression system shown in FIG. 1 during a cooling mode and during a defrost mode.

To obtain desirable refrigeration characteristics from the refrigerant, the transcritical refrigeration cycle requires higher operating pressures compared to a reverse-Rankine refrigeration cycle. With reference to FIG. 2, the pressure of the refrigerant in the gas cooler 18 is in the supercritical region of the refrigerant, i.e., at or above the critical temperature and critical pressure of the refrigerant. For example, the critical point of $CO_2$ occurs at approximately 7.38 MPa (1070 psia) and approximately 31 degrees Celsius (88 degrees Fahrenheit). In the illustrated construction, the pressure of refrigerant in the gas cooler 18 during the cooling mode is approximately 8.2 MPa (1200 psia). The pressure of refrigerant in the evaporator 26 is also higher than pressures seen in a reverse-Rankine refrigeration cycle. In the illustrated construction, the pressure of refrigerant in the evaporator 26 is approximately 2.7 MPa (390 psia). As a result, the gas cooler 18 and evaporator coil 26 employ a heavy-duty construction to withstand the higher pressures.

The controller 50 is programmed to initiate a defrost mode to defrost the evaporator coils 26 periodically based on time. For example, the controller 50 is programmed to begin defrost mode every 2 hours. Other suitable time periods may be employed, such as every 4 hours, every 6 hours, or another suitable time period.

The controller 50 is programmed to monitor compressor suction temperature and pressure at the compressor inlet 1 by way of temperature and pressure sensors 42a, 46a, respectively, during the defrost mode. A saturated vapor curve 58 for the refrigerant is stored in the controller 50. In the illustrated construction, with reference to FIG. 2, the saturated vapor curve 58 for carbon dioxide is shown. The controller 50 is programmed to calculate a saturated vapor temperature Ts based on the measured suction pressure signal from the suction pressure sensor 46a during the defrost mode. The controller 50 is programmed to include a predetermined offset X, such as 4 Kelvin, and to calculate a desired superheat temperature at the compressor inlet 1 for the defrost mode by adding the predetermined offset X to the calculated saturated vapor temperature Ts. The defrost mode includes a transition mode and a superheat mode. At the onset of the defrost mode, the system 10 is in the transition mode as the refrigerant transitions to superheat. When the desired superheat temperature at the compressor inlet 1 is reached, then the system 10 is in superheat mode.

The controller 50 is programmed to decrease the speed or frequency of the compressor 14 down to a relatively low level, e.g., low speed/frequency, at the onset of the defrost mode, i.e., during the transition mode. Low speed/frequency is generally lower than the speed/frequency of the compressor 14 during the cooling mode. Preferably, low speed/frequency is the lowest operable speed/frequency setting for the compressor 14 greater than zero. The controller 50 is also programmed to turn the gas cooler blowers 36 off and fully open the expansion valve 22 at the onset of the defrost mode, i.e., at the onset of the transition mode. As necessary, the controller 50 is also programmed to control the speed/frequency of the gas cooler blowers 36 based on a refrigerant pressure value at the compressor outlet 2 to maintain the refrigerant pressure value below a maximum permitted pressure value. The controller 50 is programmed to control the speed/frequency of the evaporator blowers 40 (e.g., on or off, high speed, low speed, etc.) during the transition mode based on a comparison between a measured suction temperature T1 at the compressor inlet 1 from sensor 42a and the desired superheat temperature (Ts+X). For example, the controller 50 is programmed such that if the measured suction temperature T1 is not greater than (or greater than or equal to) the desired superheat temperature (Ts+X), then the expansion valve 22 is partially closed and the evaporator blowers 40 remain on. Furthermore, the controller 50 is programmed such that if the measured suction temperature T1 is greater than (or greater than or equal to) the desired superheat temperature (Ts+X), then the evaporator blowers 40 are turned off and the expansion valve 22 is fully opened. The controller 50 is programmed such that, when the desired superheat temperature (Ts+X) at the compressor inlet 1 is reached or exceeded, the expansion valve 22 is fully opened and the evaporator blowers 40 are turned off.

The controller 50 is programmed to terminate the defrost mode and initiate the cooling mode when desired conditions are reached. The controller 50 is programmed to monitor the temperature T7 of the evaporator coil 26, as indicated by a signal received from the temperature sensor 42g, during the defrost mode. The controller 50 is programmed to terminate the defrost mode and initiate the cooling mode when the temperature T7 of the evaporator coil 26, as measured by the temperature sensor 42g, reaches a predetermined evaporator coil temperature. In other constructions, the controller 50 may be programmed to terminate the defrost mode and initiate the cooling mode based on other desired conditions, such as duration of defrost mode, amongst others.

FIG. 2 is a pressure-enthalpy diagram illustrating the saturated liquid line 54 for $CO_2$, the saturated vapor line 58 for $CO_2$, and the working area of the system (enthalpy vs. pressure) during the cooling mode and the defrost mode, the defrost mode being depicted as the transition mode and the superheat mode. In operation, when defrosting of the evaporator coils 26 is due, the controller 50 initiates the defrost mode. The defrost mode starts with the transition mode, in which the refrigerant increases in temperature and transitions to superheat. As shown in FIG. 2, the system working area moves to the right on the pressure-enthalpy diagram during the transition mode, from an area crossing the saturated liquid curve 54 and the saturated vapor curve 58 into an area on the right side of the saturated vapor curve 58, i.e., in the superheat region.

In the transition mode, the controller 50 decreases the speed or frequency of the compressor 14 down to low speed or frequency, as described above. Then, the controller turns the gas cooler blowers 36 off and maintains the speed of the evaporator blowers 40 while the opening of the expansion valve 22 is controlled to achieve the desired superheat temperature of refrigerant at the compressor inlet 1. If the refrigerant pressure value at the compressor outlet 2 reaches or exceeds the maximum pressure value, then the controller turns on and/or increases the speed/frequency of the gas cooler blowers 36 in order to manage the pressure at the compressor outlet 2. As described above, the desired superheat temperature is calculated by first calculating the saturated vapor temperature corresponding to the actual vapor pressure P1 measured at the compressor inlet 1, and then adding the predetermined offset X to the calculated saturated vapor temperature. In order to calculate the saturated vapor temperature, the controller 50 includes thermophysical property data, e.g., the saturated vapor curve, corresponding to the type of refrigerant used in the system 10. The controller 50 looks up the saturated vapor temperature that corresponds to the measured vapor pressure P1 for the type of refrigerant used.

During the defrost mode, the hot refrigerant gas from the compressor 14 enters and exits the gas cooler 18 with a relatively small amount of cooling of the refrigerant occurring in the gas cooler 18, i.e., substantially less cooling than in the cooling mode. The expansion valve 22 lowers the pressure of the hot gas refrigerant, and lower pressure hot gas refrigerant is produced at the outlet of the expansion valve 22. Thus, the refrigerant in the evaporator 26 begins to transition from wet vapor to hot gas. If the refrigerant at the compressor inlet 1 has not reached the desired superheat temperature, the controller 50 partially closes the opening of the expansion valve 22 in order to achieve the desired superheat temperature. When the evaporator 26 receives a hot, or superheated, gas refrigerant, signaling the end of the transition mode and beginning of the superheat mode, the controller 50 turns the evaporator blowers 40 off and fully opens the expansion valve 22. The controller 50 determines that the evaporator 26 is receiving a hot gas when the temperature T1 at the compressor inlet 1 reaches or exceeds the desired superheat temperature. Heat from the hot refrigerant gas, or superheated refrigerant gas, passing through the coils of the evaporator 26 defrosts the coils of the evaporator 26. The evaporator coil temperature increase is monitored to terminate defrost. The controller 50 terminates the defrost mode when the temperature of the evaporator coil, as indicated by the evaporator coil temperature sensor 42g, reaches a predetermined value. When the controller 50 terminates the defrost mode, the controller 50 switches back to the cooling mode.

It is to be understood that the controller 50 may include a single controller, multiple controllers or a system of controllers for controlling various aspects of the invention described herein.

Thus, the invention provides, among other things, a controller programmed to defrost a transcritical vapor compression system using a superheated refrigerant and without requiring an auxiliary heater or modified piping and in which the evaporator 26 remains on the low pressure side during both the cooling and defrost modes such that the evaporator 26 need not be dimensioned to withstand transcritical pressures. Various features and advantages of the invention are set forth in the following claims.

What is claimed is:

1. A method of defrosting a transcritical vapor compression system operable in a cooling mode and a defrost mode, the transcritical vapor compression system having a compressor for compressing a refrigerant, the compressor having a compressor inlet and a compressor outlet and operating at a first speed/frequency during the cooling mode, a first heat exchanger for cooling the refrigerant during the cooling mode, an expansion valve for decreasing the pressure of the refrigerant, the expansion valve having a variable opening, and a second heat exchanger for cooling a space during the cooling mode, the method comprising:
   decreasing the speed/frequency of the compressor during the defrost mode to a second speed/frequency lower than the first speed/frequency and greater than zero;
   directing a superheated refrigerant gas from the compressor directly to the first heat exchanger during the defrost mode, then directing the superheated refrigerant gas from the first heat exchanger directly to the expansion valve during the defrost mode, then directing the superheated refrigerant gas from the expansion valve directly to the second heat exchanger during the defrost mode; and
   defrosting the second heat exchanger with the superheated refrigerant gas.

2. The method of claim 1, further comprising controlling the opening of the expansion valve during the defrost mode to maintain a superheated refrigerant condition proximate the inlet of the compressor.

3. The method of claim 1, further comprising maintaining a superheated refrigerant condition proximate the inlet of the compressor.

4. The method of claim 3, further comprising:
   monitoring a temperature of the refrigerant proximate the compressor inlet during the defrost mode; and
   partially closing the expansion valve during the defrost mode when the temperature is less than a desired superheat temperature.

5. The method of claim 4, further comprising:
   storing in the controller a saturated vapor curve based on thermophysical property data of the refrigerant; and
   programming the controller to refer to the saturated vapor curve to determine a value based on a measured characteristic of the refrigerant proximate the compressor inlet.

6. The method of claim 5, further comprising determining the desired superheat temperature by adding an offset to the value determined with the saturated vapor curve.

7. The method of claim 4, further comprising:
   directing a fluid from the space over the second heat exchanger with a blower; and
   controlling the blower speed based on a comparison between the measured temperature and the desired superheat temperature.

8. The method of claim 1, further comprising:
   providing a blower for selectively directing a fluid over the first heat exchanger; and
   turning off the blower or controlling the speed/frequency of the blower based on a pressure value proximate the outlet of the compressor so the pressure value does not exceed a predetermined maximum.

9. The method of claim 1, further comprising fully opening the expansion valve at the onset of the defrost mode.

10. The method of claim 9, further comprising:
    monitoring a temperature of the refrigerant proximate the compressor inlet during the defrost mode; and
    partially closing the expansion valve during the defrost mode when the temperature is less than a desired superheat temperature.

11. The method of claim 10, further comprising fully opening the expansion valve when the desired superheat temperature is reached.

12. A transcritical vapor compression system, comprising:
    a compressor for compressing a refrigerant, the compressor having a compressor inlet and a compressor outlet;
    a first heat exchanger for cooling the refrigerant;
    an expansion valve for decreasing the pressure of the refrigerant, the expansion valve having a variable opening;
    a second heat exchanger for heating the refrigerant; and
    a controller programmed to decrease the speed/frequency of the compressor during a defrost mode, programmed to determine a desired superheat temperature, programmed to compare the desired superheat temperature with a measured temperature proximate the compressor inlet, and programmed to adjust the expansion valve based on the comparison between the desired superheat temperature and the measured temperature during the defrost mode, wherein the controller is programmed to direct a superheated refrigerant gas from the compressor directly to the first heat exchanger during the defrost mode, then direct the superheated refrigerant gas from the first heat exchanger directly to the expansion valve during the defrost mode, then direct the superheated refrigerant gas from the expansion valve directly to the second heat exchanger during the defrost mode.

13. The transcritical vapor compression system of claim 12, wherein the controller is programmed to determine the desired superheat temperature by determining a saturated vapor temperature corresponding to a measured pressure proximate the compressor inlet and adding an offset value to the saturated vapor temperature to determine the desired superheat temperature.

14. The transcritical vapor compression system of claim 12, further comprising a first blower for directing air over the first heat exchanger, wherein the controller is programmed to turn off the blower or control the speed/frequency of the blower based on a pressure value proximate the outlet of the compressor so the pressure value does not exceed a predetermined maximum during the defrost mode.

15. The transcritical vapor compression system of claim 12, wherein the controller is programmed to adjust the expansion valve during the defrost mode in order to maintain a superheated refrigerant condition proximate the inlet of the compressor.

16. The transcritical vapor compression system of claim 15, wherein the controller is programmed to fully open the expansion valve at an onset of the defrost mode and to fully open the expansion valve while the superheated refrigerant condition is met.

17. The transcritical vapor compression system of claim 12, further comprising a second blower for directing air over the second heat exchanger, wherein the controller is programmed to control the second blower speed/frequency based on a comparison between the temperature and the desired superheat temperature.

18. The transcritical vapor compression system of claim 17, wherein the controller is programmed to turn the second blower off when the measured temperature is greater than the desired superheat temperature.

19. The transcritical vapor compression system of claim 12, further comprising a pressure sensor positioned proximate the compressor inlet for measuring a pressure of the refrigerant and a temperature sensor positioned proximate the compressor inlet for measuring the measured temperature of the refrigerant.

* * * * *